US005745976A

United States Patent [19]

Crockett et al.

[11] Patent Number: 5,745,976

[45] Date of Patent: May 5, 1998

[54] METHOD OF MANUFACTURING AN ELECTRICAL SLIP RING BASE

[75] Inventors: Russell L. Crockett, Christiansburg; Michael J. Day, Blacksburg; Tyler W. Hamilton, Parrot; Gwendolyn C. Handy, Blacksburg; Glen M. Harris, Christiansburg; Glenn E. Lawson, Blacksburg, all of Va.

[73] Assignee: Litton Systems Inc., Woodland Hills, Calif.

[21] Appl. No.: 645,222

[22] Filed: May 13, 1996

[51] Int. Cl.[6] .............................. H01R 43/10; B23P 11/02

[52] U.S. Cl. .................................. 29/597; 29/450; 29/451

[58] Field of Search ............................ 29/597, 450, 451; 310/232; 439/23–26

[56] References Cited

U.S. PATENT DOCUMENTS

| | | | |
|---|---|---|---|
| 3,090,115 | 5/1963 | Carr | 29/450 |
| 3,314,038 | 4/1967 | Rutten | 310/232 |
| 4,317,549 | 3/1982 | Thomas et al. | 29/450 |
| 4,837,920 | 6/1989 | Sweet et al. | 29/597 |
| 5,009,604 | 4/1991 | Plocek et al. | 439/24 |
| 5,054,189 | 10/1991 | Bowman et al. | 310/232 |

*Primary Examiner*—P. W. Echols
*Attorney, Agent, or Firm*—Gerald L. Lett; Scott J. Coonan

[57] ABSTRACT

An electrical slip ring base is constructed of flexible and moldable or extrudible material so as to be capable of being formed into a variety of profiles or shapes. A rigid backing or hub stiffens or reinforces the base member. Any form of conductive rings can be used, and the base member can be formed to accommodate them.

3 Claims, 4 Drawing Sheets

FIG. 4a
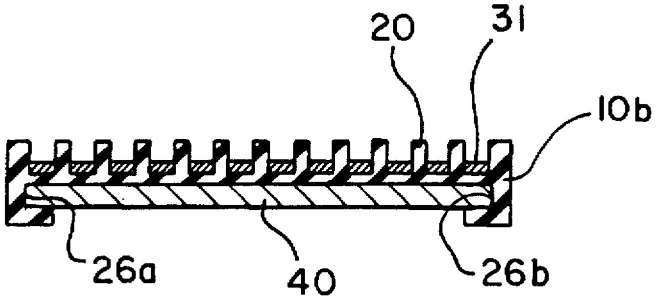
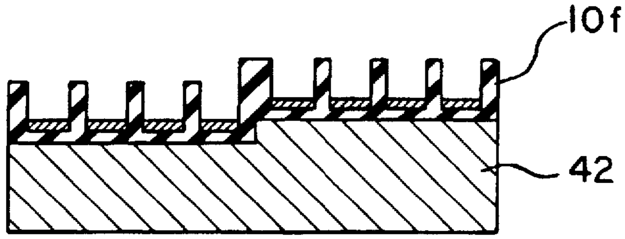
FIG. 4b

METHOD OF MANUFACTURING AN ELECTRICAL SLIP RING BASE

BACKGROUND OF THE INVENTION

This invention relates to an electrical slip ring assembly, more particularly, the base portion of the electrical slip ring and a method of manufacturing that base portion.

Electrical slip rings are now well known devices for communicating electrical signals from one structural member to another where one of the structural members is rotatable with respect to the other. Such a slip ring assembly, for example, may comprise a relatively rotatable annular base member which has a plurality of conductive rings extending around an outer circumferential face thereof. A series of electrically conductive brushes is arranged on a relatively stationary structural member to make electrical contact with the aforementioned conductive rings thereby forming a series of electrical connections between the two structural members. Of course, conversely, the base member may be stationary and the brushes may be relatively rotatable.

Heretofore, the base assemblies for the slip rings have been generally constructed in such a fashion that the conductive rings are molded therein as a part of the base while the base itself is being molded. Alternatively, the conductive rings might be plated into previously completed slip ring bases having grooves formed therein for that purpose. Where the above mentioned molding process is used, expensive tooling must be provided to support and maintain the rings at the proper position as the molding process proceeds. Using these prior art techniques where plating occurs after molding, it is not unusual to find that the plating does not adhere properly to the base member. And then, machining and replating must occur. Losses using this process can be significant. The above techniques require expensive tooling and are now proving to be prohibitively expensive.

Commonly assigned U.S. Pat. No. 5,054,189 describes a method where a rigid annular slip ring base is molded and then grooves are machined into the outer circumferential surface of the slip ring. The conductive material which may be formed as a continuous strip is cut to a series of lengths to form conductive rings. These rings are then anchored at one end to the outer circumferential surface of the slip ring base, and a rolling pressure is exerted on them around the circumference of the base to cause the rings to be press fit into the grooves previously formed on the base.

All of the above prior art structures and methods of manufacturing them do not readily lend themselves to the wide varieties of shapes, profiles and diameters which are now used in connection with modern electrical slip ring assemblies. The prior art structures and methods of manufacture do not lend themselves well, for example, to linear or non-circular applications. All of the prior art manufacturing methods are proving to be too expensive for the price pressures being experienced in today's market.

It is therefore an object of this invention to provide a new form of construction for electrical slip ring bases which lends itself to a variety of shapes, profiles, lengths or diameters.

Another object of this invention is to provide an electrical slip ring base assembly which is less expensive to manufacture but can maintain precise dimensions while being useable in connection with the manufacture of slip rings of a variety of shapes and sizes.

A further object of this invention is to provide an electrical slip ring base structure which is of a material wherein the barriers between each of the plurality of conductive rings is such that should the brush assembly stray from its path, the brushes will not be damaged by the barrier material.

Still another object of this invention is to provide an electrical slip ring base assembly structure wherein the base and the conductive strips are formed in a continuous structure and that the strip or ring can be assembled onto the base by simple flexure of the base and then allowing the base to return to its original shape.

SUMMARY OF THE INVENTION

The foregoing and other objects are achieved in a structure and method of manufacture of that structure according to the invention wherein a slip ring base is constructed to have a base member of a flexible, and moldable or extrudable material. Such a base member is capable of being formed into a variety of profiles or shapes allowing significant cost advantages to be achieved over prior art structures and manufacturing methods. A rigid backing or suitable hub for stiffening and reinforcing the foregoing base member is provided, or alternatively, the base member can be molded or extruded from a flexible, nonconductive material which has sufficient rigidity to support the conductive rings. Any form of conductive ring or strip may be used, i.e., flat, grooved or channeled, as well as those which may be plated to enhance the low noise conductivity characteristics of the slip ring. The base member and the conductive strip or rings are formed as continuous members, respectively, so that the base member is simply flexed out of shape to allow the conductive ring or rings to be placed therearound and the base member then resumes its original shape to frictionally engage the conductive rings. Alternatively, the base member or a continuous member and the rings can be wrapped or otherwise inserted into the base. (See, for example, U.S. Pat. No. 5,054,189).

BRIEF DESCRIPTION OF THE DRAWING

The principles of the invention will be most readily understood by reference to a description of preferred embodiments thereof given below in conjunction with the drawings which are briefly described as follows:

FIGS. 4*a* and 4*b* are end cross sectional views of respectively the FIG. 1*c* and FIG. 1*f* embodiments illustrating the use of rigid bases for strengthening those embodiments.

DESCRIPTION OF THE PREFERRED EMBODIMENTS

Figures 1A, 1B, 1C, 1D, 1E, 1F, 1G, 1H:
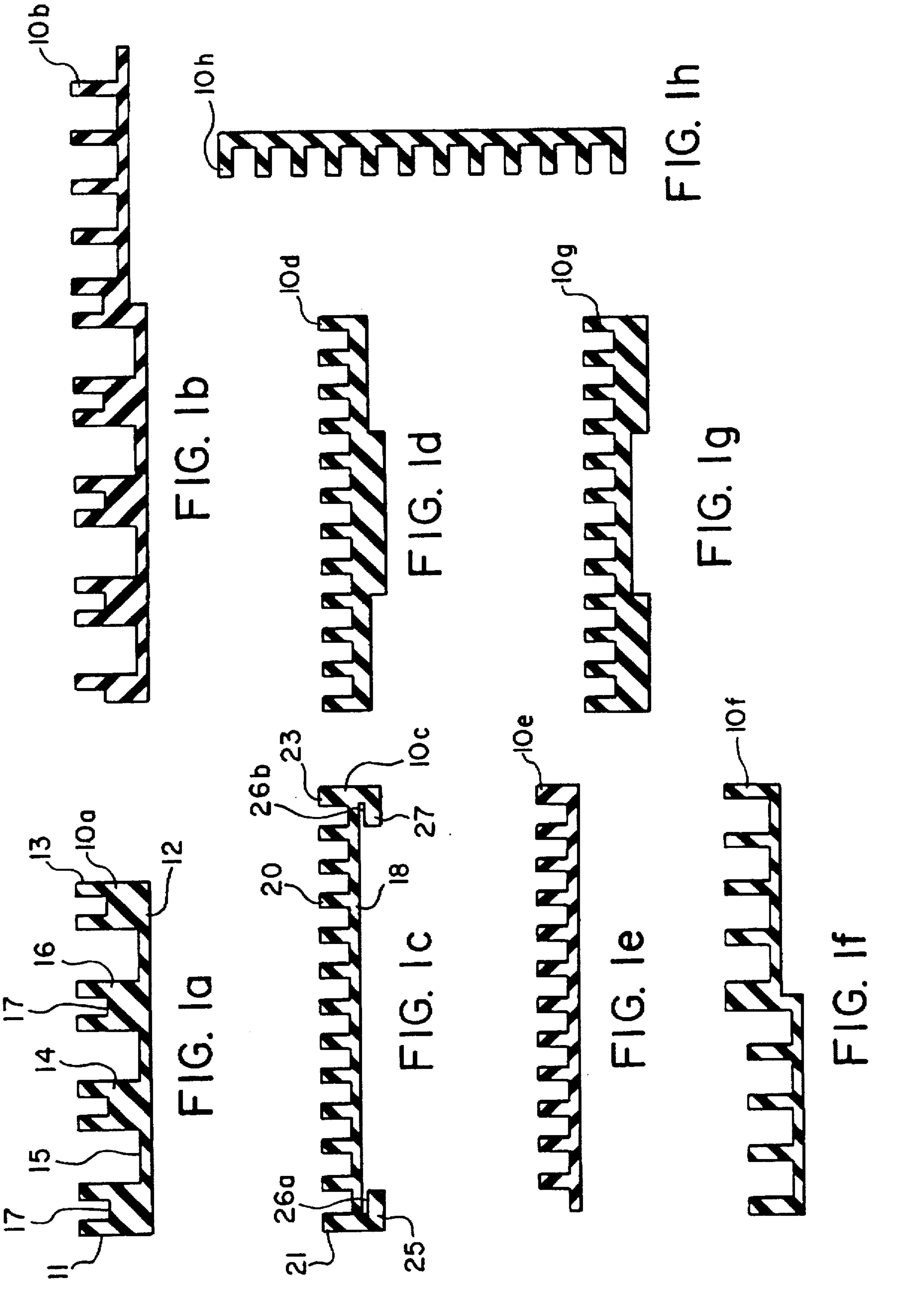
FIGS. 1*a* through *h* are end cross sectional views of preferred examples of the moldable/extrudable base members according to the invention.

FIGS. 1*a* through *h* are end cross sectional views illustrating a variety of shapes or profiles of electrical slip ring base members 10 drawn in the shapes shown from a flexible, elastomeric material. The shapes as shown can be molded or extruded depending on the specific material chosen. The shape or profile of the base member can readily be changed in the known manner by simply changing the mold or die or varying the extrusion process. The electrically nonconductive materials used to manufacture the base member may be of varying hardnesses (durometer rating). A flexible material is chosen to allow for flexible mounting on a suitable support or hub and for flexure to allow for mounting conductive rings or strips thereon. Each of the illustrated embodiments is in the form of an annular slip ring assembly wherein the base member 10 is a continuous annular structure as are the conductive rings to be described below. For example, the FIG. 1*a* configuration includes a web portion 12 extending between vertical end members 11 and 13 which extend radially outwardly of the circumferential surface of annular base member 10*a*. Barriers 14 and 16 are spaced between end members 11 and 13 forming spaces 15 between the barriers and end members to allow for mounting conductive rings or strips therein. The depressions 17 in each of the barriers and end members form a so-called "creep path" between the conductive rings so that stray voltages attempting to cross the barriers confront a path longer than the width of the barrier thereby materially reducing the possibility that such stray voltages will be able to cross from conductive ring to conductive ring. The determination of whether to use barriers having such depressions is generally made on the voltage conditions to be encountered and available spacing between conductive rings. As can be seen from the various profiles illustrated in FIGS. 1*a* through *h* barriers without such depressions may be used.

FIG. 1*c* illustrates a second embodiment of a slip ring base member 10*c* having a flat linear web portion 18 and a plurality of barrier members 20 extending radially outwardly of the annular circumferencial surface of the slip ring base member 10*c*. End members 21 and 23 extend radially inwardly of web 18 to form flange like members 25 and 27 thereby forming slots 26*a* and 26*b*. The purpose for the slots will become clear from the description given herein below.

Another example of the versatility of the form of construction of the slip ring base member described herein is illustrated in FIG. 1*f* wherein it is shown that a stepped configuration can be formed. The remaining portions of FIG. 1 illustrate a variety of other shapes illustrating the variety of structural configurations for electrical slip ring bases which can be used in accordance with the invention.

Figure 2A:
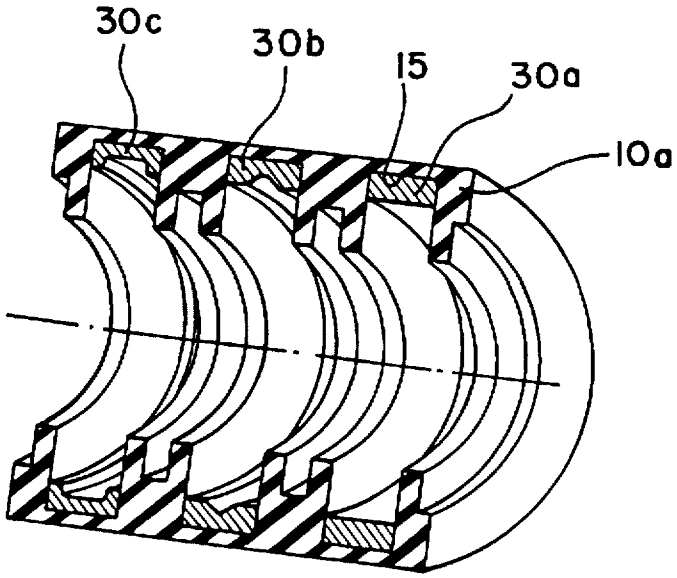
FIGS. 2*a* and 2*b* are partial cross sectional perspective views of electrical slip ring base assemblies constructed according to the invention.

It is contemplated that electrical slip ring bases can be formed according to the invention wherein the conductive rings are placed around either the inner or the outer circumferential surfaces of, for example, continuous annular slip ring base assemblies. FIG. 2*a* illustrates a slip ring base member having profile 10*a* from FIG. 1*a* and arranged so that conductive ring members 30*a–c* inserted in spaces 15 are arranged about the interior surface of the electrical slip ring base assembly.

Figure 2B:
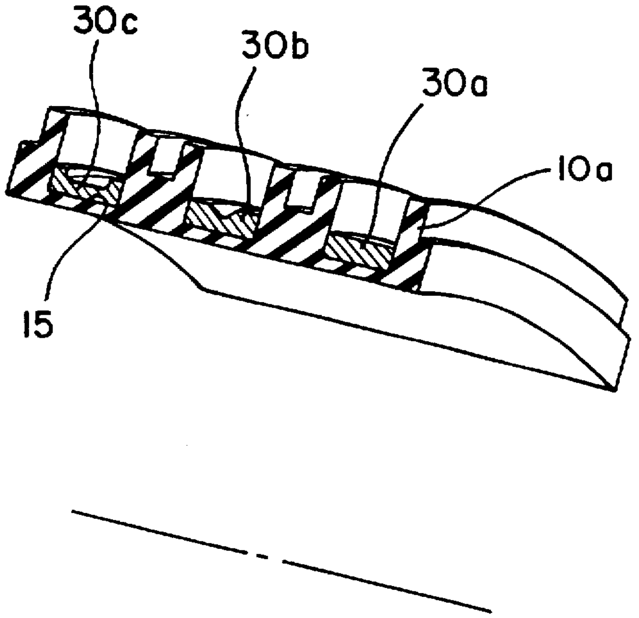

Alternatively, in FIG. 2*b* it is shown that the conductive rings 30*a–c* are arranged about the exterior circumference of base member 10*a*.

Elements 30*a*, 30*b* and 30*c* illustrate examples of the differing cross-sectional shapes of conductive ring members which may be used depending on the electrical and noise conditions being encountered. In these embodiments the conductive rings are continuous undivided annular members made of any desired conductive material which meets the electrical requirements at hand.

Figure 3B:
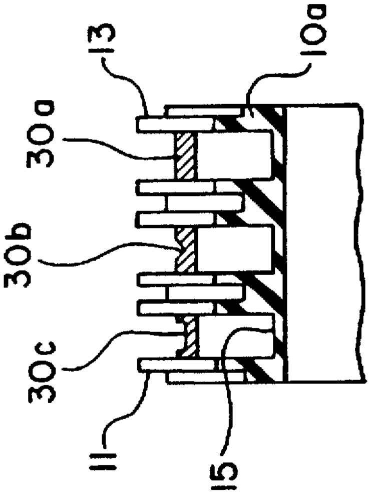
FIG. 3*b* is a cross sectional view taken along the line A—A.
Figure 3A:
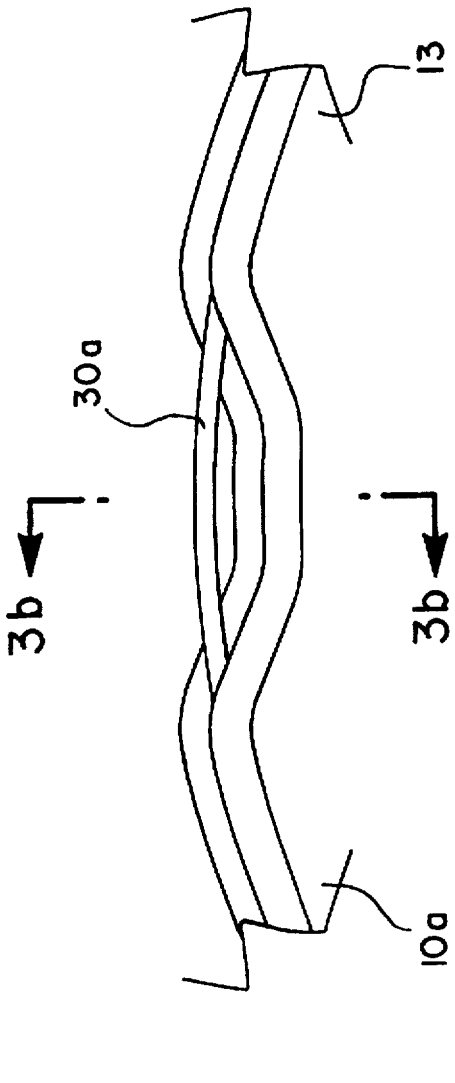
FIG. 3*a* is a partial perspective view of a portion of the outer surface of an electrical slip ring base having a conductive ring mounted thereon constructed according to the invention.

FIGS. 3*a* and 3*b* are illustrative of the manner of assembly of a conductive ring, such as 30*a*, to the slip ring base member in accordance with the invention. FIG. 3*a* is a partial perspective view of a base member 10*a* wherein at least a portion of the base member is flexed in the area of section line A—A to allow the mounting of a continuous conducting ring 30*a* in one of the spaces 15 in the base member. FIG. 3*b*, a cross sectional view taken along the line A—A, illustrates the conducting rings 30*a–c* showing their partial insertion into spaces 15 in the flexed portion of the base member 10*a*. After the conducting rings 30*a–c* are arranged in their respective spaces 15 the flexed portion of base member 10*a* is allowed to resume its original shape and the conducting rings are thereby frictionally engaged in the spaces 15 on base member 10*a*. Although not shown, it is possible to install the conductive rings in the form of flexible strips by a exerting a rolling pressure on those strips to force them into the respective spaces 15.

As stated, the slip ring base members 10*a–h* are of an elastometer materials, and if the materials chosen are too flexible and not subject to holding a suitable shape under mechanical stress, a rigid base may be utilized to provide support for the elastomer slip ring base. As shown in FIG. 4*a*, the base member 10*b* from FIG. 1*c* is designed to be provided with such a rigid base 40. The base materials used for the rigid base 40 may be any material which is relatively more rigid than the elastomer materials used to form member 10*b*; examples of such base materials can be epoxy compounds. In the FIG. 4*a* embodiment the rigid base 40 is simply inserted into slots 26*a* and 26*b* formed in base member 10*b* as discussed herein above in connection with FIG. 1*b*.

FIG. 4*b* illustrates a base member 10*f* from FIG. 1*f* provided with a rigid base 42. The rigid base 42 in this case is joined with base member 10*f* by means of a suitable adhesive or friction.

The principles of this invention are described herein above by describing preferred embodiments constructed accordingly. It is to be understood that the described embodiments can be modified or changed while remaining within the scope of the invention as defined by the appended claims.

We claim:

1. A method of manufacturing an electrical slip ring base assembly, comprising the steps of:

forming a continuous, undivided conductive strip, forming a continuous, undivided base member for carrying said conductive strip by one of a molding or an extruding process from a flexible, electrically non-conductive material, flexing said base member to allow said conductive strip to be placed there about without the application of additional external force and allowing said base member to return to its original shape so as to be in frictional engagement with said conductive strip.

2. The method of manufacturing an electrical slip ring base assembly described in claim 1 wherein said material is an elastomeric material.

3. A method of manufacturing an electrical slip ring base assembly described in claim 1 wherein the step of forming a continuous base member includes forming barriers on the surface of said base member of the same material for separating a plurality of said conductive strips.

* * * * *